US012690561B2

(12) United States Patent
Heritage, III

(10) Patent No.: US 12,690,561 B2
(45) Date of Patent: Jul. 28, 2026

(54) STRAPPING SYSTEM FOR FIELD DRESSING AN ANIMAL

(71) Applicant: Paul R. Heritage, III, Shickshinny, PA (US)

(72) Inventor: Paul R. Heritage, III, Shickshinny, PA (US)

( * ) Notice: Subject to any disclaimer, the term of this patent is extended or adjusted under 35 U.S.C. 154(b) by 0 days.

(21) Appl. No.: 18/829,563

(22) Filed: Sep. 10, 2024

(65) Prior Publication Data

US 2026/0068844 A1 Mar. 12, 2026

(51) Int. Cl.
| | |
|---|---|
| *A22C 17/02* | (2006.01) |
| *A01K 1/02* | (2006.01) |
| *A61D 3/00* | (2006.01) |

(52) U.S. Cl.
CPC ............ *A01K 1/0263* (2013.01); *A22C 17/02* (2013.01); *A61D 3/00* (2013.01); *A61D 2003/006* (2013.01)

(58) Field of Classification Search
CPC ..... A22C 17/02; A61D 3/00; A61D 2003/006
USPC ................................................ 452/185, 194
See application file for complete search history.

(56) References Cited

U.S. PATENT DOCUMENTS

| | | | |
|---|---|---|---|
| 1,311,779 A | 7/1919 | Shank | |
| 3,188,130 A | 6/1965 | Pietrowicz | |
| 3,933,154 A * | 1/1976 | Cabansag | A61F 5/3776 |
| | | | 378/208 |
| 4,177,764 A | 12/1979 | Geary | |

| | | | |
|---|---|---|---|
| 4,184,451 A | 1/1980 | Carlin | |
| 4,186,688 A | 2/1980 | Gaitan | |
| 4,308,638 A | 1/1982 | Senussi | |
| 4,317,257 A * | 3/1982 | Engel | A22B 5/161 |
| | | | 452/187 |
| 4,529,240 A * | 7/1985 | Engel | A22B 7/006 |
| | | | 452/187 |
| 4,763,942 A | 8/1988 | Lyon | |
| 4,828,307 A | 5/1989 | Sokol et al. | |
| 5,329,934 A * | 7/1994 | Bowman | A61G 7/065 |
| | | | 5/655 |

(Continued)

FOREIGN PATENT DOCUMENTS

| | | |
|---|---|---|
| DE | 202008017952 U1 | 3/2011 |
| DE | 102018116788 A1 | 1/2020 |
| WO | 1983000982 A1 | 3/1983 |

OTHER PUBLICATIONS

High Tail [https://www.vikingsl.com/high-tail/].

(Continued)

*Primary Examiner* — David J Parsley
(74) *Attorney, Agent, or Firm* — HESLIN ROTHENBERG FARLEY & MESITI P.C.

(57) ABSTRACT

A strapping system for field dressing an animal includes a central junction. The strapping system also includes a first, a second, a third and a fourth strap. Each strap has an anchored first end connected to the central junction. Each strap extends radially from the central junction to a distal second end. A leg loop is positioned along a length of each strap. The leg loop is configured to receive the hoof of an animal therethrough. The strapping system is configured to be deployed on the animal such that the central junction is positioned on a back of the animal and the straps extend from the animal's back to each of the animal's legs to secure each of the animal's legs in the leg loop of each strap.

18 Claims, 7 Drawing Sheets

(56)                  References Cited

U.S. PATENT DOCUMENTS

| | | | | | |
|---|---|---|---|---|---|
| 5,836,812 | A | * | 11/1998 | Brackett | A01M 31/006 |
| | | | | | 452/187 |
| 5,901,999 | A | | 5/1999 | Brock | |
| 6,062,520 | A | * | 5/2000 | Ralston | A01K 63/006 |
| | | | | | 248/323 |
| 6,065,790 | A | * | 5/2000 | Oswald | A01M 31/006 |
| | | | | | 224/921 |
| 6,089,636 | A | * | 7/2000 | Harris | A01K 1/0236 |
| | | | | | 294/153 |
| 6,142,547 | A | * | 11/2000 | Bowerman | A01K 27/003 |
| | | | | | 294/142 |
| 6,318,372 | B1 | | 11/2001 | Hiebert | |
| 6,569,005 | B2 | * | 5/2003 | Maxwell | A22B 5/161 |
| | | | | | 452/128 |
| 6,675,741 | B2 | | 1/2004 | Remmler | |
| 6,712,687 | B1 | | 3/2004 | Douglas | |
| 6,755,454 | B1 | * | 6/2004 | Cary | A01M 31/006 |
| | | | | | 294/165 |
| 6,837,187 | B2 | * | 1/2005 | Berardo | A01K 23/00 |
| | | | | | 294/1.3 |
| 7,125,331 | B1 | | 10/2006 | Sayers | |
| 7,252,583 | B1 | | 8/2007 | Jones | |
| 8,545,294 | B1 | * | 10/2013 | Stevens | A01M 31/006 |
| | | | | | 452/120 |
| 8,827,245 | B2 | * | 9/2014 | Pate | A22B 5/00 |
| | | | | | 254/1 |
| 8,858,307 | B2 | | 10/2014 | Frederick | |
| 9,560,855 | B1 | | 2/2017 | Ralidak | |
| 9,820,493 | B1 | | 11/2017 | Palmer | |
| 2002/0164940 | A1 | | 11/2002 | Maxwell | |
| 2006/0252359 | A1 | | 11/2006 | Helbing | |
| 2006/0276119 | A1 | | 12/2006 | Tokarski et al. | |
| 2007/0254574 | A1 | | 11/2007 | Dunagan | |
| 2009/0224562 | A1 | | 9/2009 | Carter | |
| 2010/0126056 | A1 | | 5/2010 | Nice et al. | |
| 2020/0030071 | A1 | * | 1/2020 | Ruppert | A61D 3/00 |
| 2022/0248661 | A1 | | 8/2022 | Thomason | |
| 2023/0284638 | A1 | | 9/2023 | Gibbs | |

OTHER PUBLICATIONS

Gutdaddy Deluxe Field Dressing Kit [https://www.gutdaddy.com/shop/gutdaddy-deluxe-kit].
Animal Body Positioner [https://vetorsolutions.com/products/hug-u-vac-animal-positioner].
Sold $325 Sold X-Ray Patient Positioner [https://www.usedvetequipment.com/sold-equipment/x-ray-patient-positioner].
Skin It Rite—The Whitetail [https://skinitrite.com/products].

* cited by examiner

STRAPPING SYSTEM FOR FIELD DRESSING AN ANIMAL

TECHNICAL FIELD

The present disclosure relates to systems for dressing animals in the field. More specifically, the disclosure relates to a strapping system for field dressing animals in the field.

BACKGROUND

Dressing animals (such as deer, goats, pigs, etc.) in the field is most efficiently accomplished when a hunter (or other person doing the field dressing) has unobstructed access to the abdomen area of the animal. Problematically, the legs of an animal to be dressed often get in the way of the dressing process and must be held by hand out of the way to properly expose the abdominal area.

Various prior art devices and/or systems have been utilized to secure the animal's legs and allow better access to the abdomen. Problematically, such prior art devices are cumbersome and heavy to carry for any significant distance into the field, such as into heavily wooded areas or over rugged terrain. Moreover, such prior art field dress systems often require time consuming assembly, either prior to or during attachment to the animal to be dressed. Also, such prior art devices often requires difficult hand cleaning after each use.

Accordingly, there is a need for a system for dressing an animal in the field that provides unobstructed access to the abdomen area of the animal. Further, there is a need for an easily portable, light-weight field dressing system that can more easily be transported long distances into the field. Additionally, there is a need for a field dressing system that can quickly and easily be secured to the animal being dressed. Also, there is a need for a field dressing system that can be easily washed after each use.

BRIEF DESCRIPTION OF THE INVENTION

The present disclosure offers advantages and alternatives over the prior art by providing a strapping system for dressing an animal in the field. The strapping system may be comprised substantially of fabric and may be machine washable. The strapping system may be a single piece that is portable, lightweight and easily attached to an animal in the field. The strapping system may provide unobstructed access to the abdominal area of the animal to be dressed. The strapping system may also be reconfigured in an animal drag configuration to pull an animal that has been dressed to a desired location for transportation.

A strapping system for field dressing an animal in accordance with one or more aspects of the present disclosure includes a central junction. First, second, third and fourth straps are connected to the central junction and are configured to extend radially therefrom. A leg loop is positioned along a length of each strap. Each leg loop is configured to receive the hoof of an animal therethrough. The strapping system is configured to be deployed in a field dressing configuration on the animal wherein:

the central junction is positioned on a back of the animal, the first and second straps extend to the animal's front legs to secure each front leg in the leg loop of the first and second straps, and the third and fourth straps extend to the animals back legs to secure each back leg in the leg loop of the third and fourth straps.

Another strapping system for field dressing an animal in accordance with one or more aspects of the present disclosure includes a fabric central junction. First, second, third and fourth fabric straps are connected to the central junction and are configured to extend radially therefrom. A plurality of fabric leg loops are positioned along a length of each strap. The position of each leg loop of the plurality of leg loops is associated with a corresponding different size of animal. Each leg loop is configured to receive the hoof of an animal therethrough. The strapping system is configured to be deployed in a field dressing configuration on the animal wherein:

the central junction is positioned on a back of the animal, the first and second fabric straps extend to the animal's front legs to secure each front leg in a leg loop of the plurality of leg loops of the first and second straps, and the third and fourth fabric straps extend to the animals back legs to secure each back leg in a leg loop of the plurality of leg loops of the third and fourth straps.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

BRIEF DESCRIPTION OF THE DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
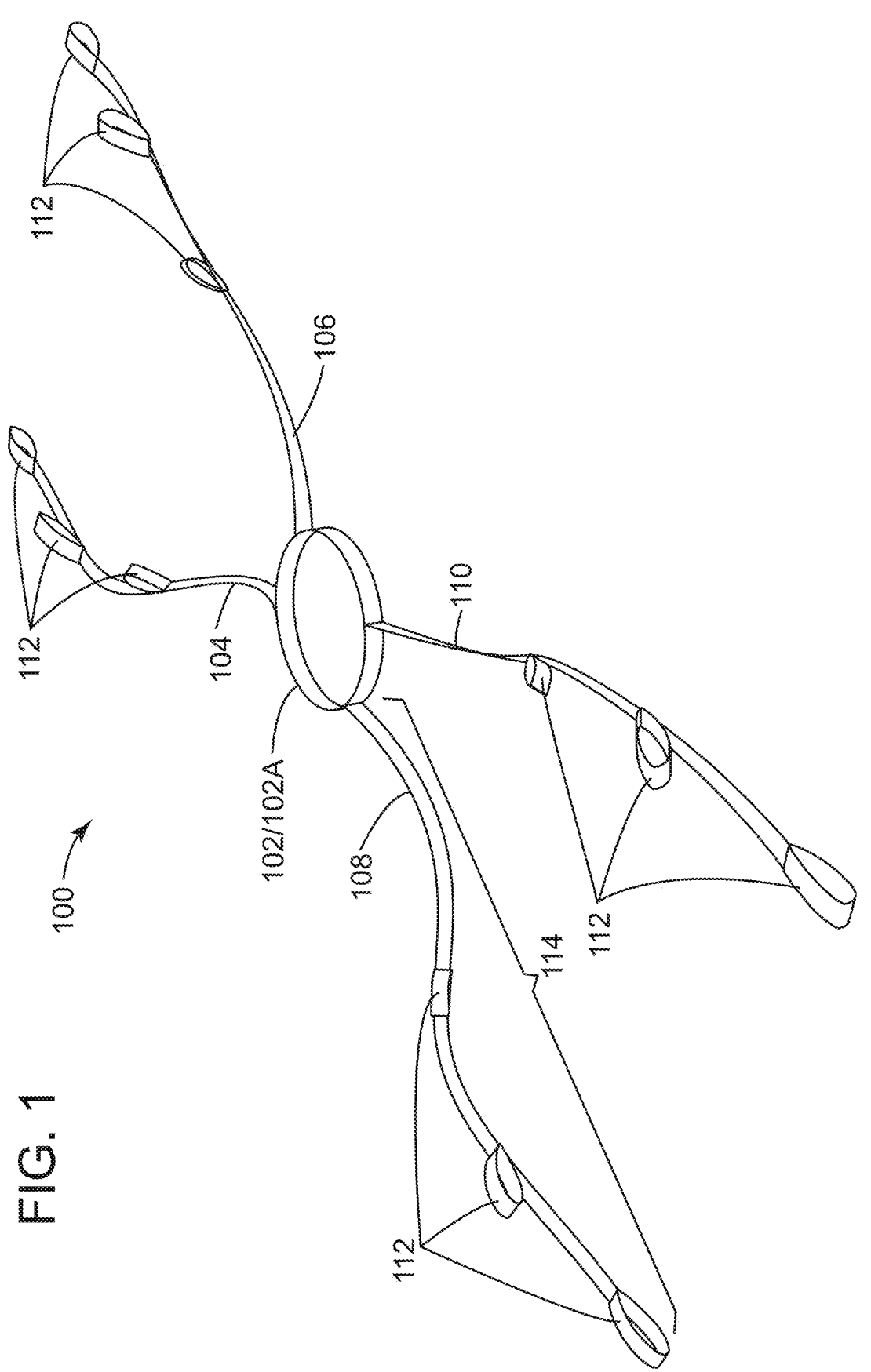
FIG. 1 depicts an example of a perspective view of a strapping system for field dressing an animal according to aspects described herein, the strapping system including four straps connected to a central junction, wherein the central junction is a central loop.

Referring to FIG. 1, an example is depicted of a perspective view of a strapping system 100 for field dressing an animal 116 (see FIG. 3) according to aspects described herein. The strapping system 100 may include a central junction 102. A first strap 104, a second strap 106, a third strap 108 and a fourth strap 110 are connected to the central junction 102 and are configured to extend radially outward from the central junction 102.

The central junction 102 may include any reasonable structure that enables the four straps 104-110 to connect to. However, in the example illustrated in FIG. 1, the central junction includes a central loop 102A. The circular loop 012A is circular in shape. However, the central loop 102 may be any appropriately shaped closed loop.

One or more leg loops 112 are positioned along a length 114 of each strap 104-110. Each leg loop 112 is configured to receive a hoof of an animal 116 therethrough (see FIG. 3). As illustrated in FIG. 1, there are three loops 112A, 112B, 112C disposed along the length 114 of the straps 104-110, wherein each loop 112 is associated with a corresponding different size of an animal. However any number of loops 112 may be positioned on the straps 104-110. For example, there may be only one loop 112 positioned at the distal ends of each strap 104-110. Alternatively there may be only one loop 112 disposed at the distal end of the first and second straps 104, 106 and a plurality of straps positioned along the lengths 114 of the third and fourth straps 108, 110.

As will be discussed in greater detail herein, the strapping system 100 is configured to be deployed in a field dressing configuration (see FIG. 3) on an animal 116. When the strapping system 100 is deployed in the field dressing configuration, the animal's legs are spread apart by the strapping system 100, with no obstructions to the abdominal area of the animal while the animal is being field dressed.

The strapping system 100 may be composed substantially of fabric, such as nylon or the like. However, the strapping system may be composed of any appropriate combination of materials. As a system composed substantially of a fabric or similar material, the strapping system would advantageously be foldable, lightweight and easily carried long distances into a field area.

Also advantageously, the strapping system 100 may be machine washable. That is if, for example, the strapping system were composed of a machine washable fabric such as nylon or the like, the system 100 could be conveniently cleaned by placing the strapping system in a commercially available washing machine.

The strapping system 100 may be a single piece system. That is, the central junction 102, each strap 104-110 and the leg loop 112 of each strap 104-110 may be permanently connected together as a single piece system. Advantageously, the single piece system could be deployed to secure an animal without any time consuming assembly prior to, or during, a field dressing procedure.

Figure 2:
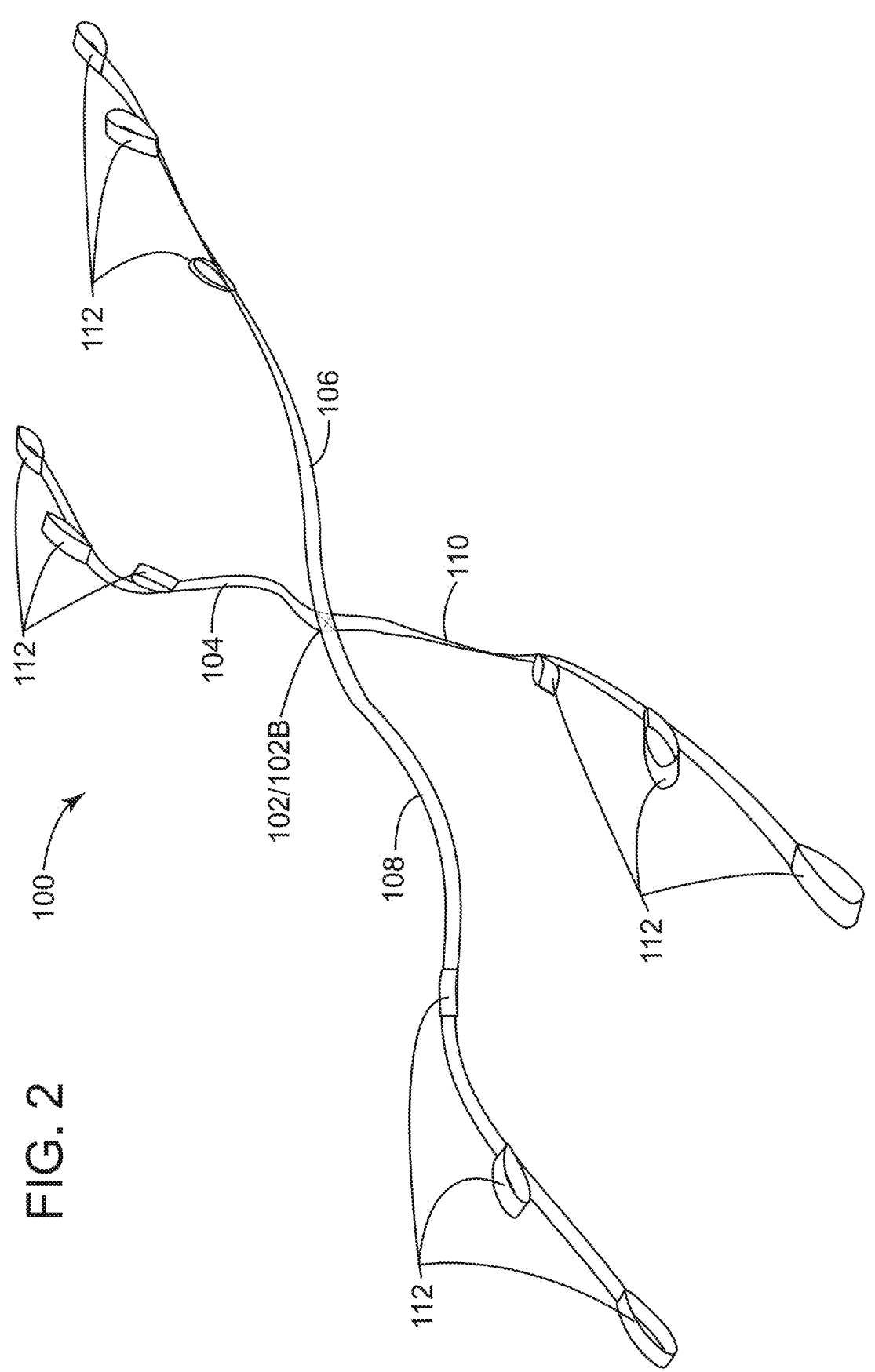
FIG. 2 depicts an example of a perspective view of another strapping system for field dressing an animal according to aspects described herein, wherein the central junction includes an intersecting section of the four straps connected together.

Referring to FIG. 2, an example is depicted of a perspective view of another strapping system 100 for field dressing an animal 116 (see FIG. 3) according to aspects described herein, wherein the central junction 102 includes an intersecting section 102B of the four straps 104-110 connected together. As disclosed earlier herein, the central junction 102 may include any reasonable structure that enables the four straps 104-110 to connect to. However, in the example illustrated in FIG. 2, the central junction 102 includes an intersecting section 102B of the first, second, third and fourth straps 104-110 connected together. The first, second, third and fourth straps 104-110 are sewn together to form the central junction 102B.

Though the four straps 104-110 are shown in FIG. 2 as being sewn to the central junction 102, any appropriate connecting device or system may be used to connect the straps 104-110 to the central junction 102. For example, the straps 104-110 may be permanently connected to the central junction 102 via staples or the like. Alternatively, the straps 104-110 may be removably connected the central junction 102 via buckles, snaps or the like.

Figure 3:
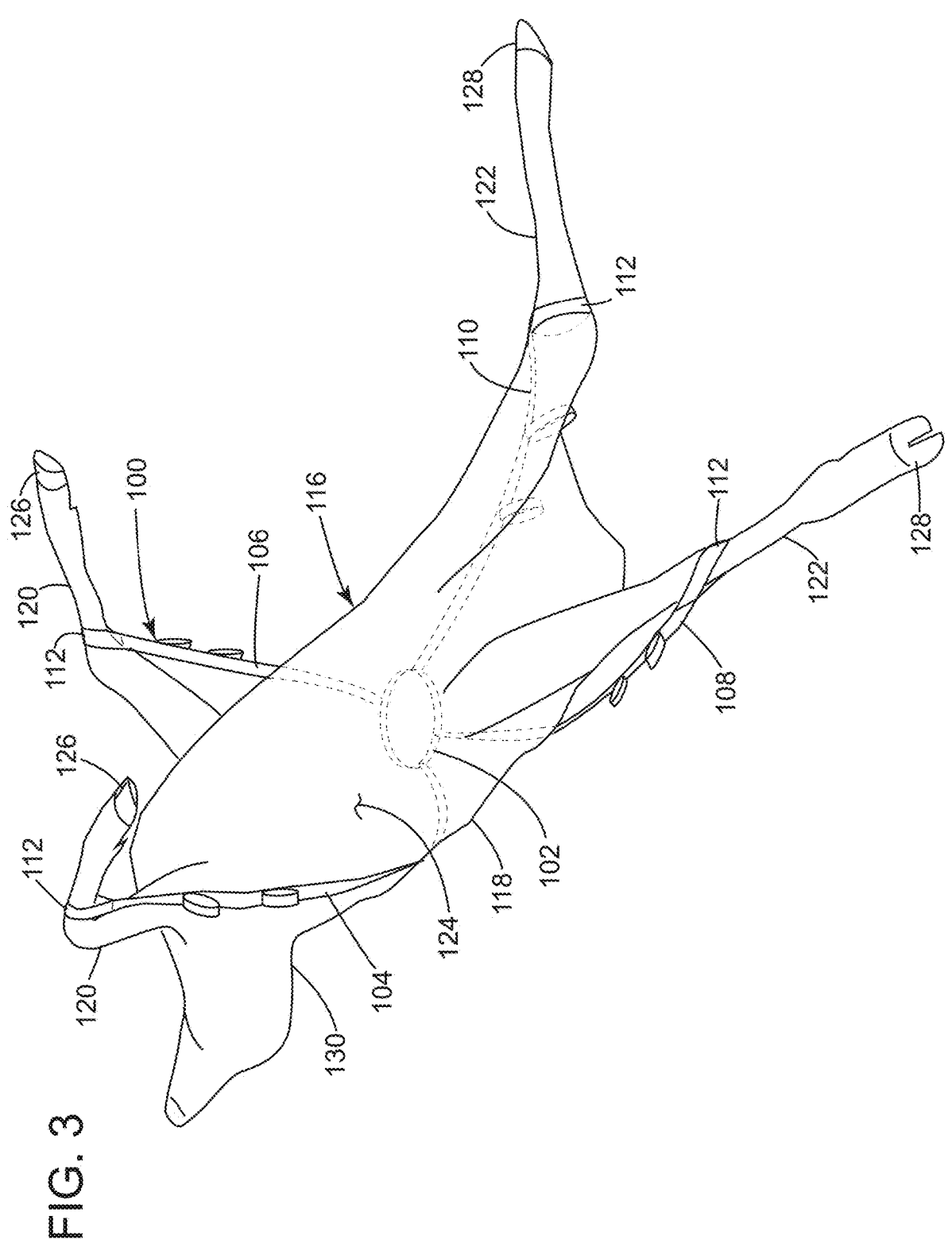
FIG. 3 depicts an example of a perspective view of the strapping system of FIG. 1 deployed in a field dressing configuration on a large animal, according to aspects described herein.

Referring to FIG. 3, an example is depicted of a perspective view of the strapping system 100 of FIG. 1 deployed in a field dressing configuration on a large animal 116, according to aspects described herein. The animal 116 in this case is a large buck. However, the strapping system may be deployed on any animal that is to be field dressed. By way of example, the strapping system 100 may be deployed on a doe, pig, goat, lamb, or any live stock or game animal that is to be field dressed.

When the strapping system 100 is deployed in a field dressing configuration on the animal 116:
the central junction 100 of the strapping system 100 is positioned on a back 118 of the animal 116,
the first and second straps 104, 106 extend to the animal's front legs 120 to secure each front leg 120 in the appropriate leg loop 112 of the first and second straps 104, 106, and
the third and fourth straps 108, 110 extend to the animals back legs 122 to secure each back leg 122 in the appropriate leg loop 112 of the third and fourth straps 108, 110.

When the strapping system 100 is deployed in the field dressing configuration, the animal's front and back legs 120, 122 are securely held spread apart by the strapping system 100, with no obstructions to the abdominal area 124 of the animal 116 while the animal is being field dressed.

To deploy the strapping system 100 in the field dressing configuration, the animal 116 may first be placed on its abdomen 124. The front hooves 126 may then be slipped through the appropriate leg loops 112 on the first and second straps 104, 106. Then the back hooves 128 may be fit through the leg loops 112 that are best suited for the size of the animal 116. The animal 116 may then be flipped on its back 118. Advantageously, the abdominal area 124 is now completely exposed and ready to be field dressed without having to hold the front and back legs 120, 122 out of the way.

Figure 4:
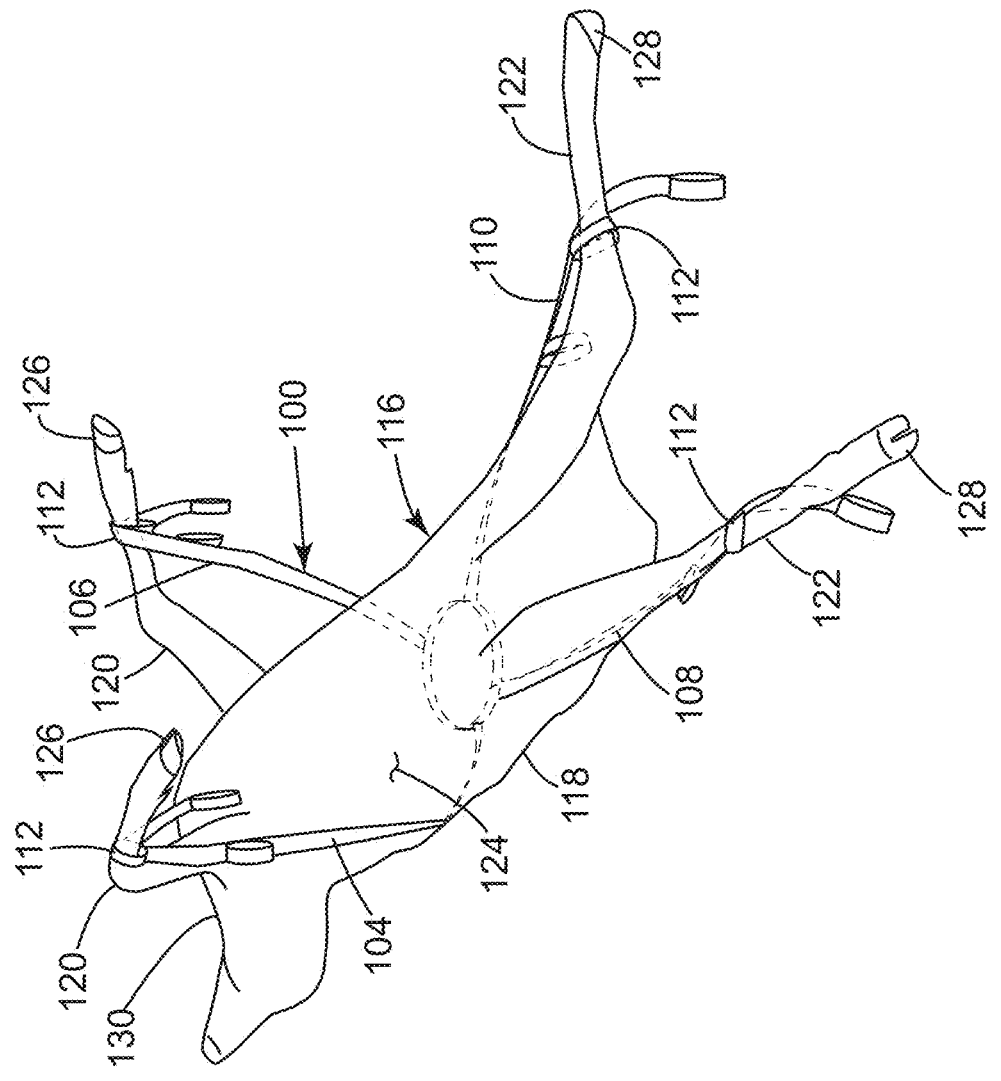
FIG. 4 depicts an example of a perspective view of the strapping system of FIG. 1 deployed in a field dressing configuration on a smaller animal, according to aspects described herein.

Referring to FIG. 4, an example is depicted of a perspective view of the strapping system 100 of FIG. 1 deployed in a field dressing configuration on a smaller animal 116, according to aspects described herein. In this example, the animal 116 that is to be field dressed is a doe that is smaller in size than the buck of FIG. 3.

To accommodate animals 116 of different sizes, the leg loops 112 of the third and fourth straps 108, 110 may include a plurality of leg loops 112 positioned along the length 114 of each strap 108, 110. The position of each leg loop 112 of the plurality of leg loops 112 is associated with a corresponding different size of animal 116. Additionally, to further accommodate animals 116 of different sizes, the leg loops 112 of the first and second straps 104, 106 may include a plurality of leg loops 112 positioned along the length 114 of each strap 104, 106. The position of each leg loop 112 of the plurality of leg loops 112 is associated with a corresponding different size of animal 116.

In the specific example shown in FIG. 4, the plurality of leg loops 112 of the first, second, third and fourth straps 104-110 include a first leg loop 112A, a second leg loop 112B and a third leg loop 112C, which are configured to receive the hooves 126, 128 and legs 120, 122 of three different sized animals 116. The doe of FIG. 4 is a medium sized animal 116 and its legs 120 122 are secured by the middle leg loops 112B. The first leg loops 112A may be used to secure smaller animals 116, such as a goat. The third leg loops 112C may be used to secure larger animals, such as the buck of FIG. 3.

Figure 5:
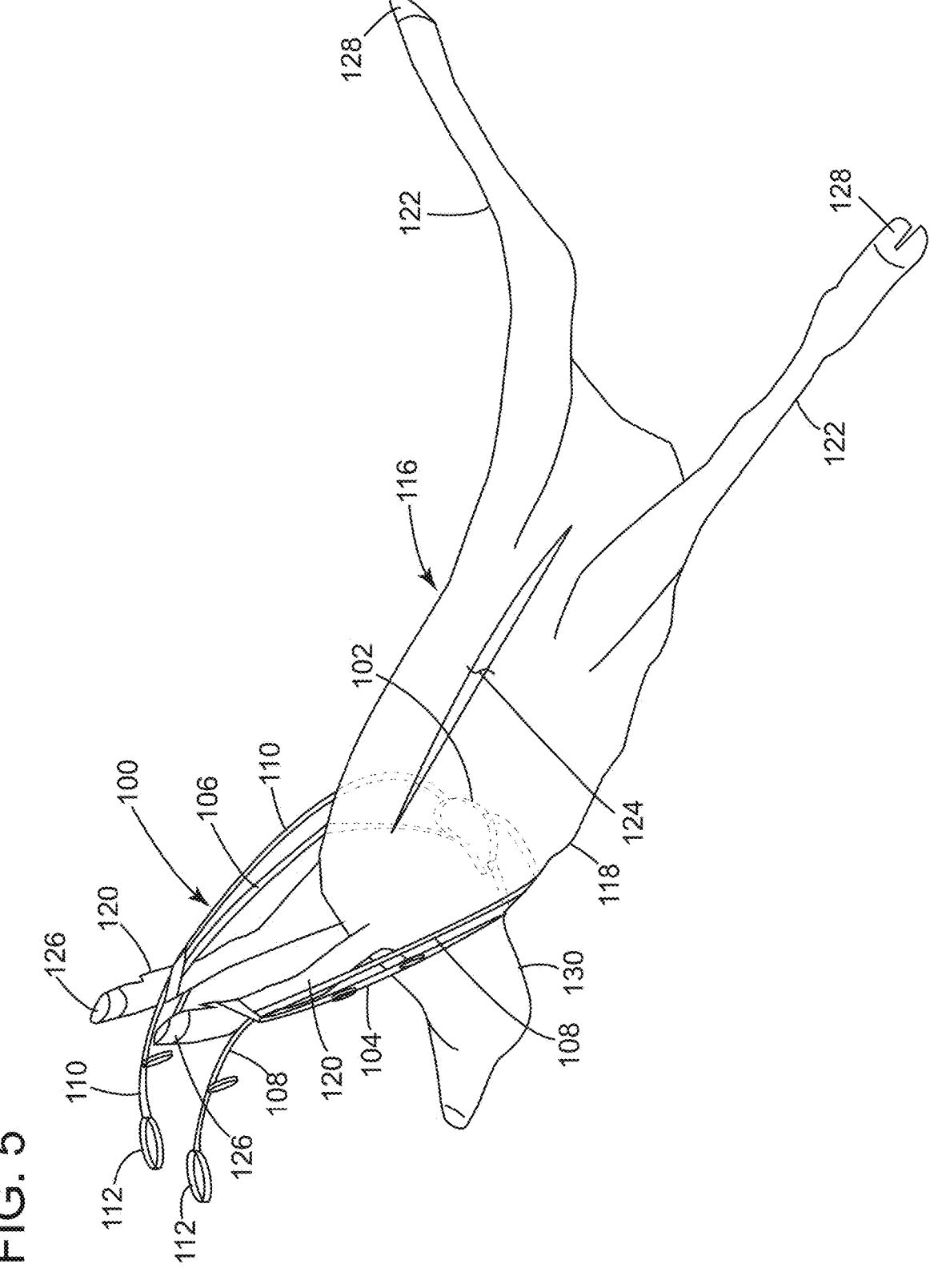
FIG. 5 depicts an example of a perspective view of the strapping system of FIG. 1 deployed in an animal drag configuration on an animal after the animal has been dressed, according to aspects described herein.

Referring to FIG. 5, an example is depicted of a perspective view of the strapping system 100 of FIG. 1 deployed in a first animal drag configuration on an animal 116 after the animal has been dressed, according to aspects described herein. After the animal 116 has been field dressed, the strapping system 100 is configured to be redeployed in a first animal drag configuration on the animal 116. In the first animal drag configuration:

the leg loops 112 of the third and fourth straps 108, 110 are removed from the back legs 122, and the third and fourth straps 108, 110 are fed through the appropriate leg loop 112 of at least one of the first and second straps 104, 106.

More specifically, the third and fourth straps 108, 110 may be fed through either the leg loop 112 on the first strap 104 that is securing a front leg 120, or the leg loop 112 on the second strap 106 that is securing a front leg 120. Alternatively, the third and fourth straps 108, 110 may be fed through the securing leg loops 112 on the first and second straps 104, 106 respectively. In the first animal drag configuration, the strapping system forms a type of cinch around the upper portion of the animal 116, wherein a person can use the leg loops 112 on the third and fourth straps 108, 110 as handles to drag the animal 116 to a desired location for further transportation.

Additionally, to secure the animal 116 even further, the third and fourth straps 108, 110 may first be wrapped around the animals neck 130, before they are fed through the securing leg loops 112 of the first and second straps 104, 106. In this way, the strapping system 100 draws the front legs 120 and the neck 130 toward each other and holds them securely, as the animal is being dragged.

Figure 6:
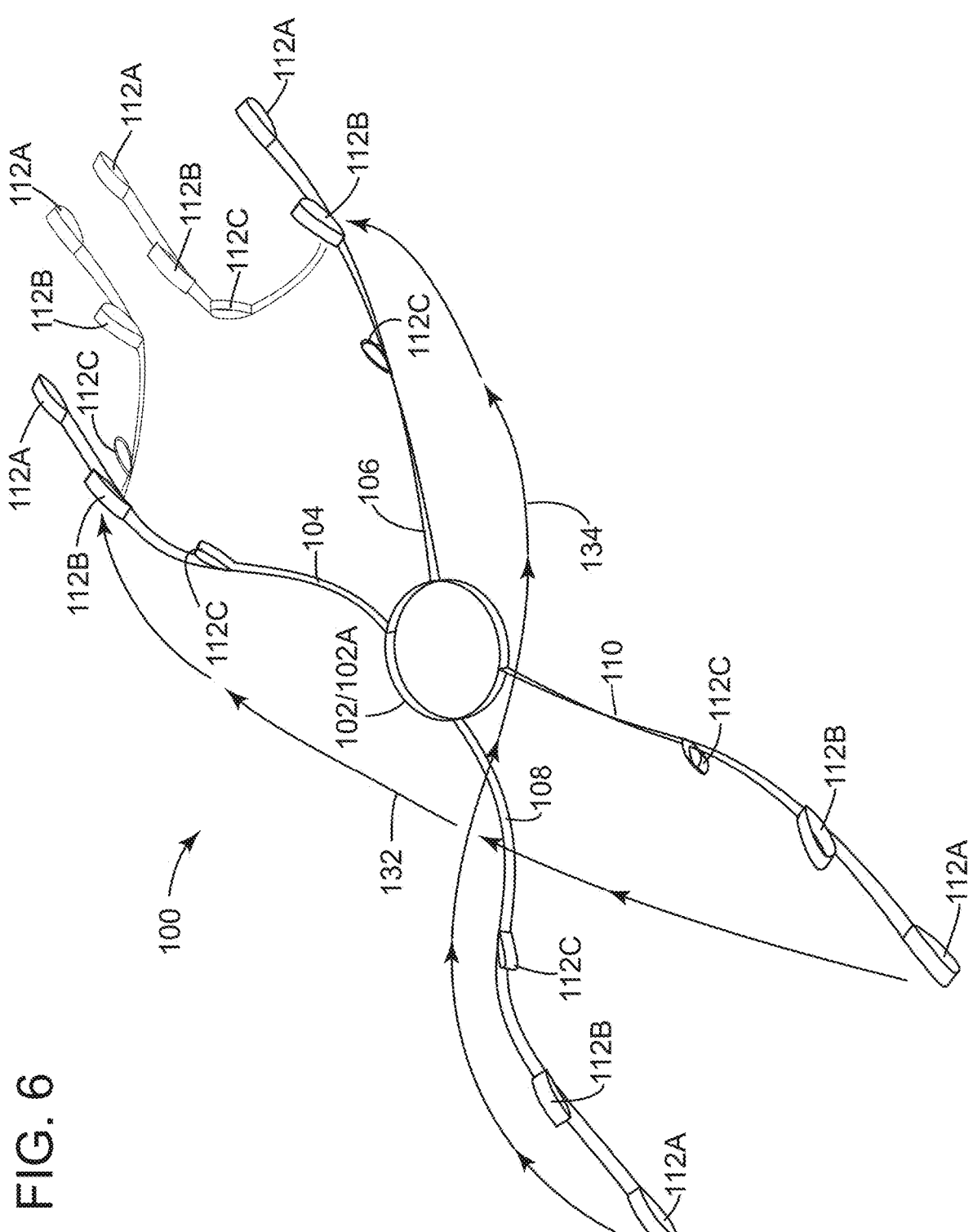
FIG. 6 depicts an example of a diagram of how to deploy the strapping system of FIG. 1 in a second animal drag configuration according to aspects described herein.
Figure 7:
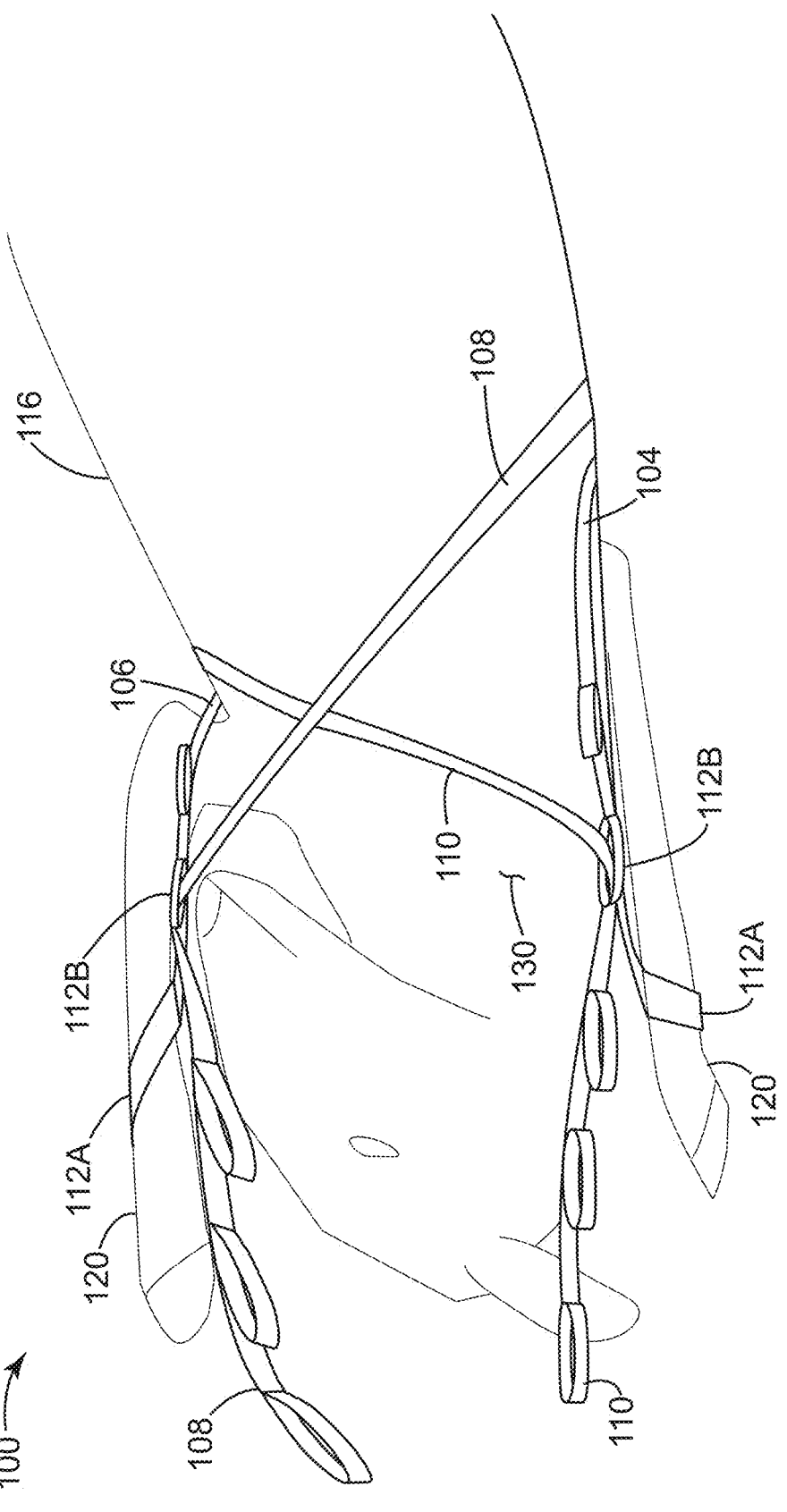
FIG. 7 depicts an example of a perspective front view of the strapping system of FIG. 1 deployed in the second animal drag configuration on an animal, according to aspects described herein.

Referring to FIGS. 6 and 7, another example is depicted of a diagram of how to deploy the strapping system 100 of FIG. 1 in a second animal drag configuration (FIG. 6) and a perspective front view of the strapping system 100 of FIG. 1 deployed in the second animal drag configuration on an animal 116, according to aspects described herein.

After the animal 116 has been field dressed, the strapping system 100 is configured to be redeployed in a second animal drag configuration on the animal 116. In the second animal drag configuration:

the leg loops of the third and fourth straps 108, 110 are removed from the back legs 122, the third and fourth straps 108, 110 are crisscrossed over the animal's neck 130, the fourth strap 110 is fed through a free leg loop 112 (i.e., a leg loop 112 that does not have an animal's leg 120, 122 extending therethrough) of the plurality of leg loops 112 positioned on the first strap 104, and the third strap 108 is fed through a free loop 112 (i.e., a leg loop 112 that does not have an animal's leg 120, 122 extending therethrough) of the plurality of loops 112 positioned on the second strap 106.

Referring more specifically to FIG. 6, the animal's front legs 120 may be secured by leg loops 112A (i.e., the leg loops positioned at the distal ends of the first and second straps 104, 106). In this example there are a plurality of three leg loops 112A, 112B, 112C positioned along the length 114 of each strap 104-110, wherein leg loop 112A is positioned at the distal end of the straps, 112B is positioned in the midsection of the straps and 112C is positioned closest to the central junction 102. The leg loops 112B and 112C on the first and second straps 104, 106 are free loops because they are not being used to secure the animal's front legs 120.

Therefore, to deploy the strapping system 100 in the second animal drag configuration, the third and fourth straps 108, 110 are crisscrossed over the animal's neck 130. Then the fourth strap 110 may be fed through the free leg loop 112B of the first strap 104 (as indicated by directional arrows 132). Then the third strap 108 may be fed through the free loop 112 B of the second strap 106 (as indicated by directional arrows 134). This forms a loop around the neck 130, which can be tightened for dragging the animal 116.

Though the strapping system 100, as illustrated in FIG. 6, has a plurality of three leg loops 112A, 112B, 112C, there may be any number of leg loops 112 positioned along the length of a strap. Further, though the middle leg loops 112B, as illustrated in FIG. 6, are the free leg loops that the third and fourth straps 108, 110 are fed through, the third and fourth straps may be fed through any free leg loop of the plurality of leg loops on the first and second straps 104, 106.

Referring more specifically to FIG. 7, the strapping system 100 is shown fully deployed in the second animal drag configuration. In similar fashion to that of the first animal drag configuration of FIG. 5, in the second animal drag configuration, the strapping system forms a type of cinch around the upper portion of the animal 116, wherein a person can use the leg loops 112 on the third and fourth straps 108, 110 as handles to drag the animal 116 to a desired location for further transportation.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it has the full scope defined by the language of the following claims.

What is claimed is:

1. A strapping system for field dressing an animal, the strapping system comprising:
   a central junction;
   a first, second, third and fourth straps connected to the central junction and configured to extend radially therefrom;
   a leg loop positioned along a length of each strap, each leg loop configured to receive the hoof of an animal therethrough;
   wherein, the strapping system is configured to be deployed in a first field dressing configuration on the animal wherein:
      the central junction is positioned on a back of the animal,
      the first and second straps extend to the animal's front legs to secure each front leg in the leg loop of the first and second straps, and
      the third and fourth straps extend to the animals back legs to secure each back leg in the leg loop of the third and fourth straps;
   wherein the leg loop of the first and second straps comprises a plurality of leg loops positioned along a length of each strap, the position of each leg loop of the plurality of leg loops being associated with a corresponding different size of animal; and
   wherein the strapping system is configured to be deployed in a second animal drag configuration on the animal wherein:
      the leg loops of the third and fourth straps are removed from the back legs,
      the third and fourth straps are crisscrossed over the animal's neck,
      the fourth strap is fed through a free leg loop of the plurality of leg loops positioned on the first strap, and
      the third strap is fed through a free leg loop of the plurality of leg loops positioned on the second strap.

2. The strapping system of claim 1, wherein, when the strapping system is deployed in the field dressing configuration, the animal's legs are spread apart by the strapping system, with no obstructions to the abdominal area of the animal while the animal is being field dressed.

3. The strapping system of claim 1, wherein the strapping system is configured to be deployed in a first animal drag configuration on the animal wherein:
   the leg loops of the third and fourth straps are removed from the back legs, and
   the third and fourth straps are fed through the leg loop of at least one of the first and second straps.

4. The strapping system of claim 1, wherein the leg loop of the third and fourth straps comprises a plurality of leg loops positioned along a length of each strap, the position of each leg loop of the plurality of leg loops being associated with a corresponding different size of animal.

5. The strapping system of claim 4, wherein the plurality of leg loops of the first, second, third and fourth straps comprise three leg loops configure to receive the hooves of three different sized animals.

6. The strapping system of claim 1, wherein the central junction comprises a central loop.

7. The strapping system of claim 1, wherein the central junction comprises an intersecting section of the first, second, third and fourth straps connected together.

8. The strapping system of claim 7, wherein the first, second, third and fourth straps are sewn together to form the central junction.

9. The strapping system of claim 1, wherein the strapping system is configured to be machine washable.

10. The strapping system of claim 1, wherein the central junction, each strap and the leg loop of each strap are permanently connected as a single piece system.

11. The strapping system of claim 1, wherein the strapping system is comprised substantially of fabric.

12. A strapping system for field dressing an animal, the strapping system comprising:
   a fabric central junction;
   a first, second, third and fourth fabric strap connected to the central junction and configured to extend radially therefrom;
   a plurality of fabric leg loops positioned along a length of each strap, the position of each leg loop of the plurality of leg loops being associated with a corresponding different size of animal, wherein each leg loop is configured to receive the hoof of an animal therethrough;
   wherein, the strapping system is configured to be deployed in a first field dressing configuration on the animal wherein:
      the central junction is positioned on a back of the animal,
      the first and second fabric straps extend to the animal's front legs to secure each front leg in a leg loop of the plurality of leg loops of the first and second straps, and
      the third and fourth fabric straps extend to the animals back legs to secure each back leg in a leg loop of the plurality of leg loops of the third and fourth straps; and
   wherein the strapping system is configured to be deployed in a second animal drag configuration on the animal wherein:
      the leg loops of the third and fourth straps are removed from the back legs,
      the third and fourth straps are crisscrossed over the animal's neck,
      the fourth strap is fed through a free leg loop of the plurality of leg loops positioned on the first strap, and
      the third strap is fed through a free leg loop of the plurality of leg loops positioned on the second strap.

13. The strapping system of claim 12, wherein, when the strapping system is deployed in the field dressing configuration, the animal's legs are spread apart by the strapping system, with no obstructions to the abdominal area of the animal while the animal is being field dressed.

14. The strapping system of claim 12, wherein the plurality of fabric leg loops of each strap comprises three leg loops configure to receive the hooves of three different sized animals.

15. The strapping system of claim 12, wherein the strapping system is configured to be machine washable.

16. The strapping system of claim 12, wherein the central junction, each strap and the plurality of leg loops of each strap are permanently connected as a single piece system.

17. The strapping system of claim 12, wherein the fabric central junction comprises a fabric central loop.

18. The strapping system of claim 12, wherein the fabric central junction comprises an intersecting section of the first, second, third and fourth straps connected together.

* * * * *